United States Patent [19]
Boutier et al.

[11] 4,225,677
[45] Sep. 30, 1980

[54] PROCESS FOR THE CHLOROMETHYLATION OF POLYMERS FOR THE PRODUCTION OF ANIONIC EXCHANGE RESINS

[75] Inventors: Jacques L. Boutier; Paul D. A. Grammont; Jean E. E. Herbin, all of Chauny, France

[73] Assignee: Diamond Shamrock Corporation, Dallas, Tex.

[21] Appl. No.: 2,850

[22] Filed: Jan. 12, 1979

[30] Foreign Application Priority Data

Feb. 1, 1978 [FR] France .................................. 78 02726

[51] Int. Cl.$^2$ ................................................ C08F 8/24
[52] U.S. Cl. ........................................ 521/31; 525/344
[58] Field of Search ..................... 526/40, 42, 44, 47, 526/47.6; 521/31, 32

[56] References Cited

U.S. PATENT DOCUMENTS

| | | | |
|---|---|---|---|
| 3,425,990 | 2/1969 | Corte et al. | 526/46 |
| 3,533,969 | 10/1970 | Bufton | 526/46 |
| 3,995,094 | 11/1976 | Crosby et al. | 526/46 |

*Primary Examiner*—Joseph L. Schofer
*Assistant Examiner*—Peter F. Kulkosky
*Attorney, Agent, or Firm*—William A. Skinner

[57] ABSTRACT

Improved process for the chloromethylation of crosslinked vinylaromatic polymers and copolymers wherein a chlorine generator is incorporated into the reactants and a metallic chloride replaces part or all of the sulfuric acid used in forming the chloromethylating complex. The chloromethylated polymer may be further functionalized to produce an ion-exchange resin.

7 Claims, No Drawings

PROCESS FOR THE CHLOROMETHYLATION OF POLYMERS FOR THE PRODUCTION OF ANIONIC EXCHANGE RESINS

FIELD OF THE INVENTION

This invention relates generally to an improved process for the haloalkylation of aromatic polymers or copolymers, and more particularly to the haloalkylation of styrene-divinylbenzene copolymers to produce anion-exchange resins.

BACKGROUND OF THE INVENTION

Haloalkylation, generally chloromethylation, is a well known reaction which is an important step in the preparation of anion-exchange resins. It allows the introduction of reactive sites on which ion-exchange groups will attach in the resin matrix. It follows from this that the ion-exchange capacity of the resin obtained will depend upon the number of haloalkyl sites introduced into the skeleton.

Generally, the chloromethylation process is carried out in a nonaqueous medium by reacting chloromethyl methyl ether ($CH_3OCH_2Cl$), pure or mixed with a solvent, on bead polymers or copolymers at temperatures between about 0° and 70° C. and with reaction times ranging from 0.5 to 8 hours. The reaction is catalyzed by Friedel-Crafts type compounds, protonic or Lewis acids.

Another process for chloromethylation of bead copolymers or polymers consists of using reaction mixtures which produce chloromethyl methyl ether in situ. These reaction mixtures may be, for example, mixtures of paraformaldehyde and hydrochloric acid; mixtures of formaldehyde polymers and aluminum chloride; mixtures of methylal, thionyl chloride and catalyst; mixtures of methylal, sulfuryl chloride plus chlorosulfonic acid, or chlorosulfonic acid only; and mixtures of methylal, chlorosulfonic acid, and an oxygen-containing polar liquid. Such reaction mixtures are also known as chloromethylating complexes. Among these chloromethylating complexes the most commonly used are the ones obtained from chlorosulfonic acid. The reaction may be represented as:

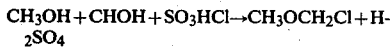

The advantages of using chloromethylating complexes are well-known, and include no direct handling of chloromethyl methyl ether which is a very toxic compound; no separation operation, i.e. the complex is a homogeneous liquid miscible with most of the organic solvents which can be used simultaneously during the chloromethylation; and limitation of the number of reactors required which results in a reduction in equipment investment. In addition, particularly in the case of the preparation of complexes leading to sulfuric acid formation, the catalyst is produced at the same time as the chloromethylating compound. Therefore the quantity of Lewis acid type catalyst required for the chloromethylation reaction is reduced to a large degree.

However the drawbacks resulting from the use of complexes containing large quantities of sulfuric acid are also well known. Too great an excess of sulfuric acid leads to the formation of large amounts of waste sulfuric acid which presents corrosion and pollution problems. Large excesses of sulfuric acid also lead to the formation of methylic bridges between the aromatic rings in the polymer skeleton, resulting in appreciable additional cross-linking in comparison to the initial cross-linking of the polymer or copolymer used. This reduces the number of haloalkyl groups introduced and thus the number of available sites for further reaction with the ion-exchange functional group. The ion-exchange resins obtained are dense and less porous.

In some cases this additional cross-linking may be desirable, since a higher cross-linking rate modifies the final ion-exchange characteristics such as capacity and dry matter. However, until now it has not been possible to regulate this additional cross-linking rate.

Therefore, an object of the present invention is to provide a process of chloromethylation for cross-linked vinylaromatic polymers or copolymers using a chloromethylating complex. This process permits a reduction in or control of the additional cross-linking obtained where using such a complex.

SUMMARY OF THE INVENTION

The process of the invention involves the chloromethylation of cross-linked vinylaromatic polymers or copolymers using a chloromethyl methyl ether/sulfuric acid based chloromethylating complex. The process is characterized by the fact that a part of the reagent is a chlorine generator, and the sulfuric acid used in the formation of the chloromethylating complex is replaced by an equivalent quantity of metallic chloride. Thus if a mixture of formaldehyde, methanol and chlorosulfonic acid is used as a chloromethylating complex, a part of the chlorosulfonic acid is replaced by an equivalent quantity of metallic chloride. The metallic chloride used may be an alkali metal or alkaline earth metal chloride.

DETAILED DESCRIPTION OF THE INVENTION

According to the process of the invention, the chloromethylation may be described as follows:

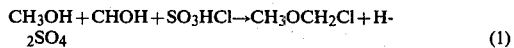

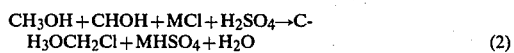

The quantity of metallic chloride is such that a sulfuric acid/chloromethyl methyl ether molar ratio at least equal to 0.4 is obtained in the chloromethylating complex. This ratio may range from about 0.4 to about 1.0. If the ratio is less than about 0.4, the catalytic activity due to sulfuric acid becomes negligible and the quantity of water produced in the second reaction becomes too large.

The following examples are given to illustrate the invention and are not to be considered restrictive. Examples 1 and 2 are comparative and illustrate the previous techniques.

EXAMPLE 1

Chloromethylation using chloromethyl methyl ether is described. About 100 g of styrene-divinylbenzene copolymer (5% divinylbenzene) is chlormethylated with a mixture containing 220 ml chloromethyl methyl ether, 100 ml methylene chloride and 51 g of zinc chloride at 40° C. for eight hours. The crosslinked polystyrene based beads are drained and washed with methyl alcohol.

A strong base anion exchange resin is produced by amination of the chloromethylated beads as follows. To 100 g of beads is added 100 ml of water, then 72 g of trimethylamine (in aqueous solution at 250 g/l) is added over three hours while maintaining the temperature from about 3° to 30° C. The reaction mixture is then held for three hours at 40°-42° C.

After cooling, 30 g of caustic soda solution (47%) is added and the mixture is distilled to recover residual amine. The beads are drained and washed with hot water for three hours. About 560 ml of a strong base anion exchange resin with 1.32 equivalents/liter and 4.12 equivalents/kilo are obtained.

EXAMPLE 2

A chloromethylating complex is prepared by dissolving 300 g of paraformaldehyde in a flask with 400 ml of methanol while cooling the mixture so that the temperature does not exceed 40° C. Then 1.17 g of chlorosulfonic acid is added to obtain a mixture consisting of chloromethyl methyl ether and sulfuric acid.

About 100 g of styrene-divinylbenzene copolymer (5% divinylbenzene) is chloromethylated with 620 g of the chloromethylating complex prepared as described, with 10 ml of ferric chloride (40%) for eight hours at 40° C. The chloromethylated beads are washed and aminated as described in Example 1.

About 450 ml of anionic resin with an exchange capacity of 1.38 equivalents/liter and 3.70 equivalents/kilo are obtained.

EXAMPLE 3

The technique of the invention is described. The chloromethylating complex is prepared by introducing 225 g of a solution containing 46% formaldehyde, 44% methanol and 10% water into a flask equipped with an agitator and a condenser. Then 14 g of methanol and 58.5 g of sodium chloride are added. Next 292 g of chlorosulfonic acid is introduced slowly, with cooling. In this stage the sulfuric acid/chloromethyl methyl ether ratio in the mixture is 0.43.

The complex obtained is used to chloromethylate 100 g of styrene-divinylbenzene copolymer (5% divinylbenzene) under the same conditions as in Example 2. The chloromethylated beads are then washed and aminated as in Examples 1 and 2.

About 520 ml of anion exchange resin with an exchange capacity of 1.33 equivalents/liter and 3.95 equivalents/kilo is obtained.

EXAMPLE 4

The process of Example 3 is repeated using 52.5 g of sodium chloride and 303 g of chlorosulfonic acid (sulfuric acid/chloromethyl methyl ether ratio of 0.5). About 500 ml of anion exchange resin with an ion-exchange capacity of 1.4 equivalents/liter and 3.9 equivalents/kilo is obtained.

In comparison with Examples 1 and 2, Examples 3 and 4 demonstrate that in the preparation of a chloromethylating complex it is possible, when using a mixture of metallic chloride and chlorosulfonic acid as a chlorine generator, to maintain a sufficiently high sulfuric acid concentration to use it as a chloromethylation catalyst and at the same time to reduce additional crosslinking. The process of the invention also allows the control of certain characteristics of the final product (capacity, dry matter).

It is notable that starting from an identical weight of the same styrene-divinylbenzene copolymer, a much larger volume of the final anionic resin is obtained by the method of the invention (500–520 ml versus 450 ml).

What is claimed is:

1. In a process for the chloromethylation of crosslinked vinylaromatic polymers and copolymers using a chloromethylating complex based on chloromethyl methyl ether and sulfuric acid, the improvement which comprises incorporating chlorosulfonic acid into the reactants and replacing the sulfuric acid used in formation of the complex with an equivalent quantity of alkali metal or alkaline earth metal chloride, the amount of metal chloride being adjusted to provide a sulfuric acid/chloromethyl methyl ether molar ratio of at least 0.4 in the complex.

2. The process according to claim 1 wherein the chloromethylating complex is obtained from a mixture of formaldehyde, methanol and chlorosulfonic acid, and a portion of the chlorosulfonic acid is replaced by an equivalent quantity of an alkali metal or alkaline earth metal chloride.

3. The process according to claim 1 wherein the sulfuric acid/chloromethyl methyl ether molar ratio is between 0.4 and 1.

4. The process of claim 1 including the additional step of adding a functional group to the chloromethylated polymer to produce an anion exchange resin.

5. The process according to claim 4 wherein a functional group is added by amination.

6. A chloromethylated polymer prepared according to the process of claim 1.

7. An anion exchange resin prepared according to the process of claim 4.

* * * * *